C. J. HOLSLAG.
ALTERNATING CURRENT WELDING TRANSFORMER.
APPLICATION FILED OCT. 24, 1917.

1,305,360.

Patented June 3, 1919.

WITNESSES
William P. Goebel
C. Bradway

INVENTOR
C. J. Holslag.
BY Munn & Co.
ATTORNEYS

UNITED STATES PATENT OFFICE.

CLAUDE JOSEPH HOLSLAG, OF PEEKSKILL, NEW YORK.

ALTERNATING-CURRENT WELDING-TRANSFORMER.

1,305,360.  Specification of Letters Patent.  Patented June 3, 1919.

Application filed October 24, 1917. Serial No. 198,252.

*To all whom it may concern:*

Be it known that I, CLAUDE J. HOLSLAG, a citizen of the United States, and a resident of Peekskill, in the county of Westchester and State of New York, have invented a new and Improved Alternating - Current Welding-Transformer, of which the following is a description, such as will enable others skilled in the art to make and use the same.

Heretofore it has been the general practice to use direct current for electric arc welding and cutting, the same being obtained when the source of power is alternating in character by means of a motor generator set in which a direct current generator is suitably designed for the voltage desired and the control effected by suitable resistances to limit the current and voltage and hence the heat liberated at the work. Such a system is very wasteful of current and hence expensive to operate as well as being difficult to move around, but while it operates it has the objectionable feature that the limits of the current and voltage and hence the heat are too far apart for good welding unless the operator is expert and can counter-act the tendency to vary.

Constant current for welding obtained by various automatic means is some advance in the art, but while it provides for the control of the current it does not provide for the control of the voltage across the arc and hence the heat is not constant, since heat results from the product of amperes and volts across the arc. Self controlled direct current electric generators with internal field control have been employed with good results but, as stated, such systems are expensive in first cost and in cost of operation, as well as being non-portable in many cases.

As many of our present day electrical systems of supply and distribution are of the alternating current type, it is obvious that an alternating current apparatus suitable for welding and cutting is highly desirable, but due to the difficulty of maintaining a stable arc with alternating current it has only been used commercially to a very limited extent and in a most inefficient manner.

It is the general object of this invention to provide a simple, novel and self controlled apparatus with the characteristics desired to give proper heat control, which will allow welding or cutting by the use of current from an alternating source of supply without any other special apparatus than the machine itself which delivers the welding current at the voltage of the arc, the apparatus being quickly adjustable to get the different combinations of voltage and current required for cast iron, aluminum, bronze or steel welding or for carbon arc welding.

It is generally understood that with direct current the positive electrode produces greater heat than the negative electrode, which is very objectionable and I have found, after a long study of this subject, that the alternating or reciprocating arc possesses many advantageous features over the direct current arc and gaseous flames, such as oxy-acetylene, in that the alternating arc has a far greater penetrating power and more uniform heating effect with the same amount of energy consumed at the arc and also, due to the greater agitation of the molten metal, a more homogeneous weld is made. In fact, after the weld is made by my machine, the weld will break elsewhere rather than at the weld when put under stress.

After a long study and many tests I have found:—

First:—That the welding transformer or transforming device should deliver a constant rate of energy at the arc in order to get the greatest localized uniform heating effect. That is, for a given instant, if the volts increase the current should decrease and vice versa.

Second:—The control of the energy should be automatic within the machine itself and should cover wide limits to suit the various classes of work and various sizes and classes of electrodes.

Third:—That the transformer or transforming device should have a quick acting puncture or guardian voltage on open circuit or tendency to open circuit which would be caused by the presence of dirt, oil, slag, etc., in the metals to be welded, cut or repaired; that is to say, where a slag covered electrode is used, or dirt or oil be on the metal or material to be welded or repaired and this foreign matter gets in the way, tending to put out the arc or open the circuit, the puncture or guardian voltage should be present to act instantaneously to break through or push out of the way the foreign matter.

Fourth:—That the puncture or guardian voltage should be readily adjustable for any particular piece of work at hand, such adjustment being made by varying the voltage taps on both the primary and secondary windings as well as a quick adjustment either manual or automatic of the flux paths through both primary and secondary windings.

Fifth: That the transformer or transforming device, while possessing all of the above mentioned features and characteristics and others which will occur to an expert welder, should be small and compact so as to be readily portable and have an electrical efficiency far greater than welding apparatus now on the market and have a greater speed in welding, that is to say, pounds of material deposited per hour to be greater than in present known machines or methods.

For a more complete understanding of the invention, reference is had to the following description and claims, taken in connection with the accompanying drawings, which illustrate diagrammatically certain embodiments of which the simplest form of the invention is capable and in which—

Figure 1:
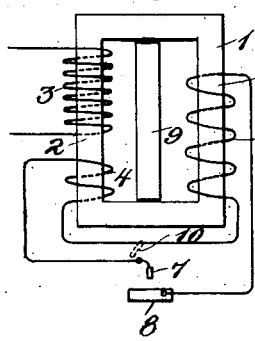
Figure 1 is a single phase transformer with a flux diverter which in some cases may be dispensed with if the magnetic circuit of the core is arranged so as to invite or cause leakage between certain sections of the core as hereinafter pointed out.

Referring now to the details, the transformer embodies preferably a closed circuit laminated core 1 on the leg 2 of which is a primary winding 3 adapted to be connected with a suitable source of alternating current. The secondary winding is made in two sections 4 and 5, the first being arranged on the leg 2 of the core which carries the primary winding, and the coil 5 is arranged on the opposite leg 6 of the transformer core. The sections 4 and 5 are connected in series and the terminals are adapted to be connected respectively with the welding or cutting electrode 7 and the work 8 that is to be welded, repaired or cut. In the core is a flux diverter 9 which may be adjusted mechanically or electrically to regulate the heating effect of the welding or cutting arc. The section 5 can be directly connected with the electrode 7 by the switch or other connection at 10 so that by the use of the primary winding 3, the secondary section 5 and the flux diverter, the transformer will be adapted for special carbon arc or metallic welding or cutting and the transformer will effectively maintain a constant product of current and voltage. When the primary winding 3 and both coils of the secondary are in service and the core is designed to invite leakage between the legs carrying the primary 3, section 4, and that carrying section 5, so that the flux diverter 9 is not required, the apparatus will maintain a constant product of voltage and current and is adapted for general welding and for cutting or burning away of metal. When all the windings are used in addition to the flux diverter 9, the transformer is especially useful for extraordinary welding where the conditions to be met are delicate such as if the work is oily or dirty or the electrodes covered with a flux or slag or when a high puncturing voltage is necessary to maintain the arc, or for welding of metals other than steel.

Figure 2:
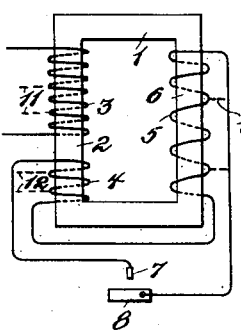
Fig. 2 is a single phase transformer, similar to Fig. 1, but having taps brought out on both primary and secondary to vary the effective lengths of the winding; no flux diverter is shown in this figure.

Fig. 2 shows a transformer in which the flux diverter is omitted, and core design is such as to invite leakage between the windings on the leg 2 and that on the leg 6, the various energy values being obtained by the use of taps 11 on the primary and taps 12 on the secondary windings so as to vary the effective lengths of either or both for the purpose of varying the voltage and current for different classes of work.

Figure 3:
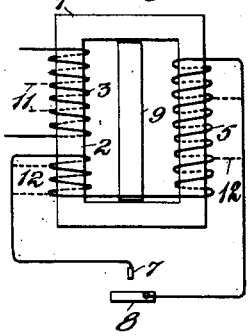
Fig. 3 is a single phase transformer showing a combination of Figs. 1 and 2.
Figure 4:
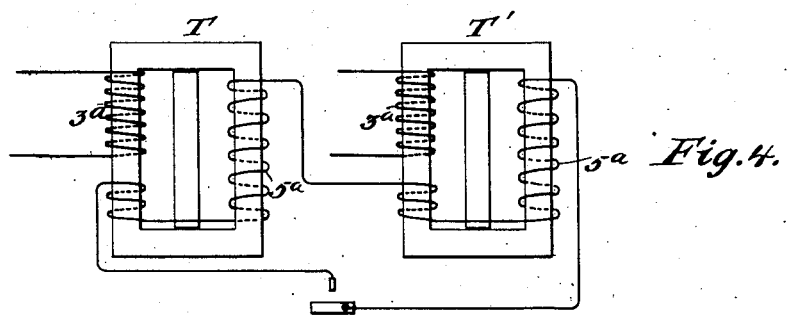
Fig. 4 is a set of two transformers, as shown in Fig. 1, for a two-phase circuit with three or four wires so that equal current can be drawn from each phase for single welding circuits. Similar combinations may be made up using the transformers shown in Figs. 2 and 3.

In Fig. 3 the transformer is a combination of the two types shown in Figs. 1 and 2 and the parts are correspondingly designated by reference characters.

In a two-phase circuit the apparatus is composed of two transformers T and T' which may be of any of the designs shown in Figs. 1 to 3 inclusive. The primary windings 3ª are connected with the respective phase circuits of the alternating current source and the secondary coil 5ª of one transformer is connected in series with the secondary coil 5ª of the other transformer.

In other words the secondary windings are in series with each other enabling the primary winding to be balanced.

Figure 5:
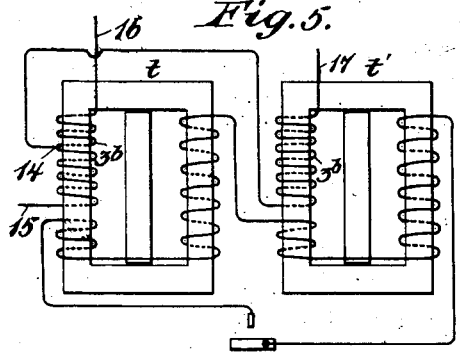
Fig. 5 is a set of two transformers for a three-phase circuit with "Scott" connection, three to two-phase and two-phase to single phase, as in Fig. 4.
Figure 6:
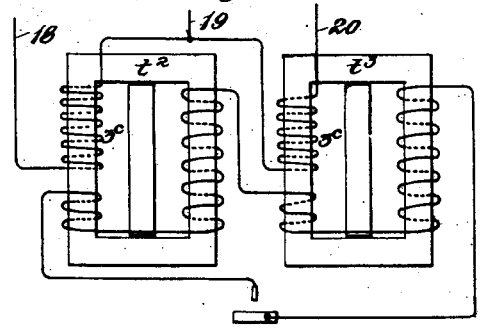
Fig. 6 is a three-phase arrangement, open delta, with one phase reversed in order to obtain approximately double voltage for the secondary circuit.
Figure 7:
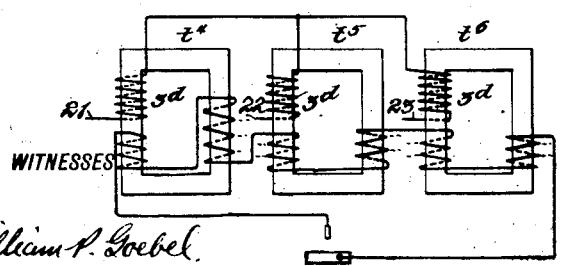
Fig. 7 is a combination of three transformers for a three-phase circuit, with one phase reversed so that the secondary voltage is approximately twice the voltage of any one transformer, without which arrangement the sum of the voltage either in series or in multiple would be zero.

In Figs. 5 to 7 are shown transformers connected in various ways for a three-phase power supply circuit. In each case the secondary windings of the transformers are connected in series. In Fig. 5 one terminal of the primary winding $3^b$ of transformer $t'$ is connected at an intermediate point 14 in the winding $3^b$ of the transformer $t$, the power leads being designated 15, 16 and 17. According to Fig. 6 the power lead 18 is connected wtih one terminal of the primary winding $3^c$ of the transformer $t^2$; the lead 19 connected between the windings $3^c$ of the transformers $t^2$ and $t^3$, and the other power lead 20 is connected with the winding $3^c$ of the transformer $t^3$. In Figs. 6 and 7 one phase of the power circuit is reversed otherwise the secondary voltage would be zero, and the arrangement is such as to produce a secondary voltage substantially double that of one transformer.

According to Fig. 7, three transformers $t^4$, $t^5$ and $t^6$ are employed and the primary winding $3^d$ of the various transformers are connected with the power leads 21, 22 and 23 in Y formation, and the secondary windings of the several transformers are connected in series. Obviously in other multiple phase systems various combinations of transformers may be employed on the same principle. It is to be understood that in the polyphase arrangements the welding apparatus may be built into one unitary structure which is readily portable since the welding outfit is, in itself, very small and weighs for the single phase type less than 250 pounds complete.

Referring particularly to Fig. 3 during the welding operation the magnetic conditions of the leg 2 carrying the primary winding 3 and the section 4 (which I preferably term the main secondary winding) remain quite constant but the magnetic conditions of leg 6 carrying the section 5 (which I preferably term the auxiliary secondary) are variable depending on the secondary current. That is to say, the magnetic flux threading the auxiliary winding 5 is variable and the operative characteristics of this winding therefore change with the flux, not only with the flux in the primary leg 2 but also with the flux in the leg 6 and it is these changes in operative characteristics which assist in holding the arc; that is to say, the relation of the auxiliary secondary 5 to the primary and main secondary 4 is such that when the moving electrode of a given size is in contact with the stationary electrode, the condition of a short circuit, the current in both primary and secondary is held to a predetermined maximum value and the uniform part of the induced voltage is obtained from the main secondary coil 4 as the current through the auxiliary winding 5, which is somewhat above the normal welding current, sets up a magnetic flux that tends to prevent the primary flux from entering the core leg 6, but when the electrodes are separated, the auxiliary winding 5 having a high operative characteristic acts rapidly to produce an arc that is easily drawn and maintained by the winding 5 then assisting the main secondary 4. When the arc is lengthened, by any cause, and the current tends to decrease, the induced voltage in the auxiliary winding 5 increases and hence tends to prevent the reduction of the current, and at the time the induced flux from the primary enters the core leg 6 which produces a change in the operative characteristics of the auxiliary secondary winding 5 which again tends to increase the voltage across the arc and thus to maintain a steady persistent arc; the auxiliary secondary coil 5 thus serves to produce a voltage which is adapted to vary rapidly to suit the conditions of the arc so that when the work is oily or dirty, or the electrodes are covered with a flux or slag the means of producing the puncturing voltage is ever present, to act, if required.

From a consideration, by one skilled in the art, of the method of operation of my transformer or transforming device when connected in a welding circuit, it will be understood that the auxiliary secondary coil 5 generates an E. M. F. which shifts in phase relation with respect to the E. M. F. generated in the main secondary 4 during the welding, cutting or repairing operations and that the combination of these voltages will produce a resultant voltage which reciprocates across the arc produced between the electrodes from a prolonged maximum value of one polarity to a prolonged maximum value of opposite polarity.

As already stated the taps from either the primary or secondary or both together with the flux diverter serve to give a control in which the volts and amperes compensate each other. That is to say, if the operator lengthens the arc slightly the volts go up and the current drops and vice versa and one end of the secondary can be connected directly to the work and the other terminal directly to a cutting, welding or repair electrode, thus avoiding the interposition of outside regulation or regulating resistances or impedances which, as heretofore stated, result in large waste of power. With my apparatus any type of electrode, either bare or covered, can be used and the heat delivered to the arc is maintained substantially constant within ordinary limits.

The operation of the polyphase devices is similar to that set forth in connection with Fig. 3.

While I have shown and described diagrammatically certain forms of my inven-

Having thus described my invention, what I claim is:—

1. Apparatus utilizing alternating current for metallic arc welding, cutting and repairing including a polyphase transformer having a plurality of magnetizable core units, each core unit having a primary winding on one leg thereof, a secondary arranged in two sections, one on that part of the core with the primary and the other on a part of the core remote from the primary and first section, said secondary windings of each core unit adapted to be connected in series and to welding, cutting or repairing electrodes.

2. Apparatus utilizing alternating current for metallic arc welding, cutting and repairing including a polyphase transformer having a plurality of magnetizable core units, each core unit having a primary winding on one leg thereof, a secondary arranged in two sections, one on that part of the core with the primary and the other on a part of the core remote from the primary and first section, said secondary windings of each core unit adapted to be connected in series and to welding, cutting or repairing electrodes, and a flux controller coöperating with at least one of said core units to assist in controlling the amount of current through said arc electrodes.

3. Apparatus utilizing alternating current for metallic arc welding, cutting and repairing including a polyphase transformer having a plurality of magnetizable core units, each core unit having a primary winding on one leg thereof, a secondary arranged in two sections, one on that part of the core with the primary and the other on a part of the core remote from the primary and first section, said secondary windings of each core unit adapted to be connected in series and to welding, cutting or repairing electrodes, a flux controller coöperating with at least one of said core units and taps on certain of said windings to vary their effective lengths whereby the heat of the arc between said electrodes can be adjusted to suit the work.

4. Apparatus utilizing alternating current for metallic arc welding, cutting and repairing including a transformer having a plurality of magnetizable core units, each core unit having a primary winding on one leg thereof, a secondary arranged in two sections, one on that part of the core with the primary and the other on a part of the core remote from the primary and first section, said primary winding of each core unit adapted to be connected to different phases of a polyphase circuit and said secondary windings of each core unit adapted to be connected individually to welding, cutting or repairing electrodes or in series in one welding circuit including such electrodes.

5. Apparatus utilizing alternating current for electric arc welding, cutting and repairing including a polyphase transformer having a plurality of magnetizable core units, each core unit having a primary winding on one leg thereof, a secondary arranged in two sections, one on that part of the core with the primary and the other on a part of the core remote from the primary and first section, said secondary windings of each core unit adapted to be connected in series to welding, cutting or repairing electrodes, while the primary of one core unit is connected to the source of current in reverse phase relation with respect to the other primary or primaries whereby substantially double voltage is obtained in the welding, cutting or repairing circuit.

6. Apparatus utilizing alternating current for metallic arc welding, cutting and repairing including a polyphase transformer having a plurality of magnetizable core units, each core unit having a primary winding on one leg thereof, a secondary arranged in two sections, one on that part of the core with the primary and the other on a part of the core remote from the primary and first section, said secondary windings of each core unit adapted to be connected in series in a single welding, cutting or repairing circuit while the primaries are connected to different phases of a polyphase circuit whereby substantially equal current is drawn from each phase during the welding, cutting or repairing operations.

7. Apparatus utilizing alternating current for electric arc welding, cutting and repairing including a transformer having a plurality of closed circuit core units, each core unit having a primary winding on one leg and a secondary with a main portion on the leg with the primary and an auxiliary portion on a leg remote from the primary, said primaries adapted to be connected to a polyphase circuit while said secondaries are adapted to be connected in series in a single welding, cutting or repairing circuit whereby substantially equal power is drawn from each phase of the polyphase circuit.

8. Apparatus utilizing alternating current for metallic arc welding, cutting and repairing including a transformer having a closed circuit core unit, a primary winding on one leg thereof, a secondary having a main section on the same leg of the core along side the primary and an auxiliary section on another leg of the core remote from the primary and said main section whereby the two sections act to direct the flux in said core unit to meet the conditions of the welding or cutting arc formed between metal electrodes connected to the secondary terminals of said core unit.

9. Apparatus utilizing alternating current for metallic arc welding, cutting and repairing including a transformer having at least one magnetizable core unit with primary and secondary windings thereon, said secondary winding being divided in two portions connected together, one of which is arranged along side the primary and the other portion on a part of the core remote from the primary and first portion whereby the two portions of the secondary generate E. M. F's. which combine to maintain an arc when such arc is struck between metal electrodes connected to the secondary terminals.

CLAUDE JOSEPH HOLSLAG.